United States Patent Office 2,722,067
Patented Nov. 1, 1955

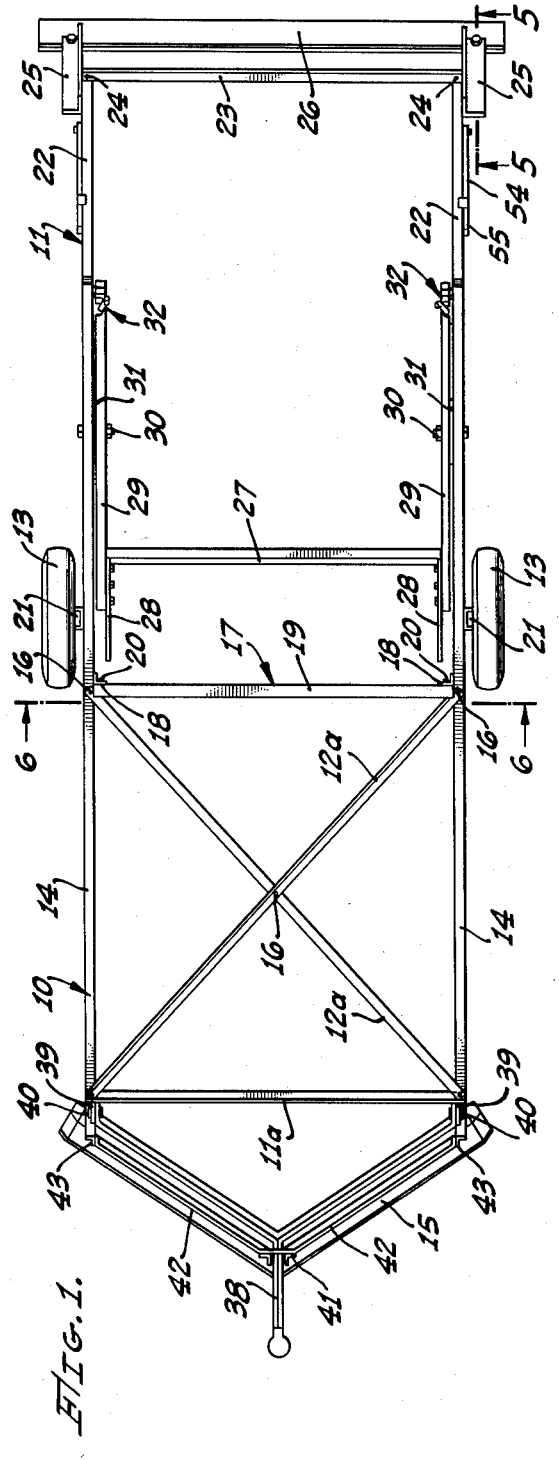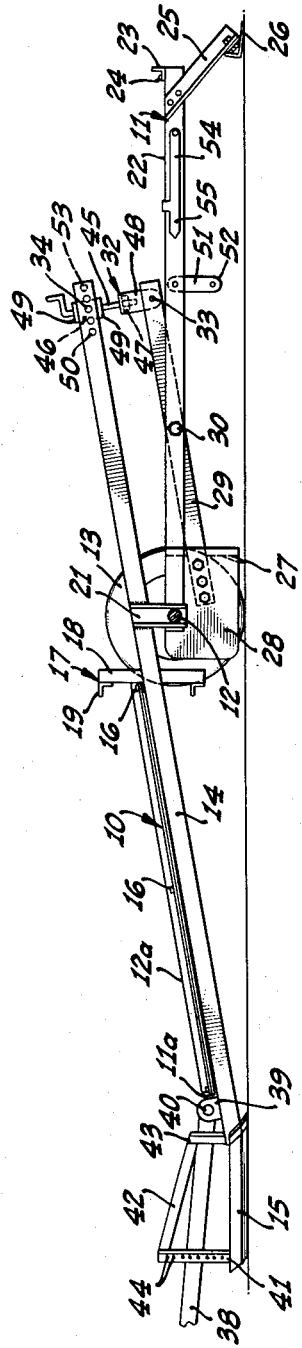

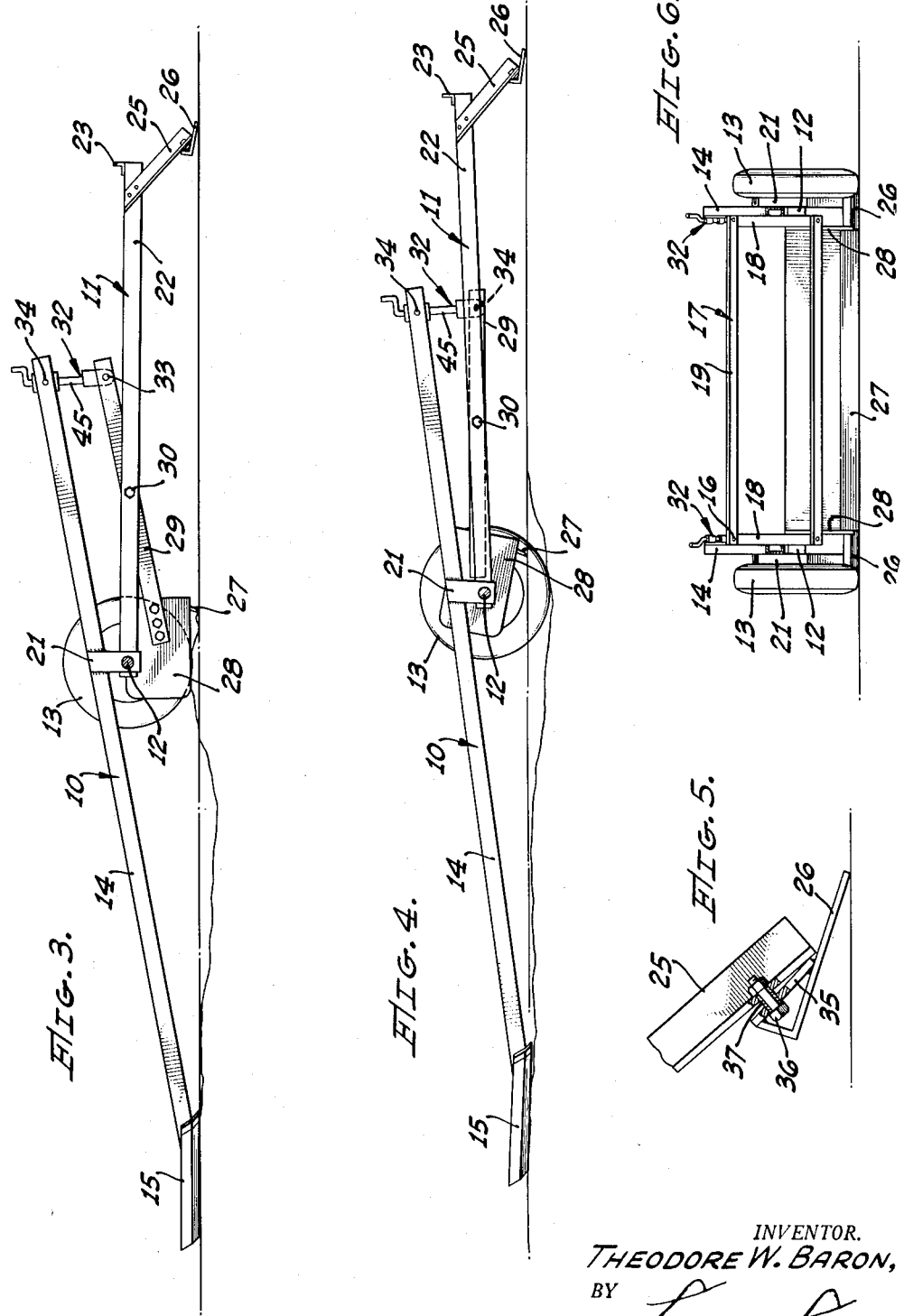

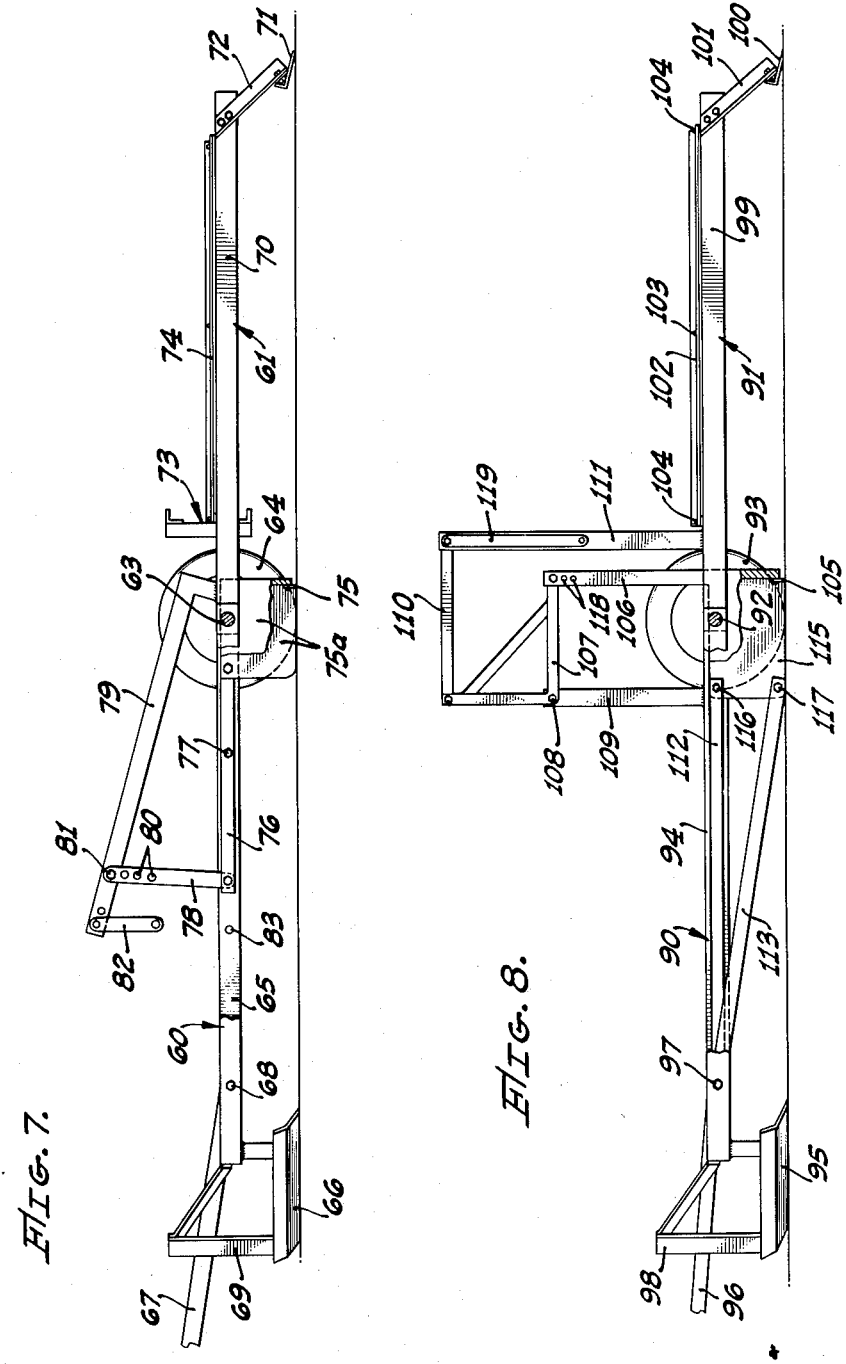

2,722,067

LAND LEVELER

Theodore W. Baron, Oxnard, Calif.

Application December 5, 1949, Serial No. 131,168

10 Claims. (Cl. 37—169)

This invention relates to earth-working machines and has particular reference to an improved land leveler.

One of the objects of my invention is to provide a novel land leveler wherein the earth-working or scraping blade may be maintained in substantially the same predetermined cutting plane, regardless of the irregularities in the land being worked.

Another object of my invention is to provide a novel land leveler having simple means for adjusting the depth of cut of the blade.

Another object of my invention is to provide a land leveler having novel means for securing the leveler in inoperative position for transportation thereof.

Another object of my invention is to provide a novel land leveler having an extremely low overall height, such that it is especially adapted to the leveling of land in and around orchards without danger of injuring or disturbing the branches of low-hanging trees.

A further object of my invention is to provide a novel land leveler of simple and inexpensive construction, yet which is well adapted for the purpose for which it is designed.

Briefly, my invention is directed to a land leveler in which the position of the earth-working blade is independent of the ground-contacting wheels. The blade-suspending means are arranged so that the blade will cut into and level off humps or rises in the ground, pushing the excess soil ahead until a low portion is reached, whereupon the soil from the previous rise will be deposited to fill in the low portion.

Other objects and advantages it is believed will be apparent from the following detailed description of a preferred embodiment thereof as illustrated in the accompanying drawings.

In the drawings:

Figure 1 is a top plan view of a preferred embodiment of my invention.

Figure 2 is a side elevation thereof, partly in section.

Figure 3 is a diagrammatic view of the leveler illustrating the linkage action when the ground-contacting wheel rides over a hump in the ground.

Figure 4 is a diagrammatic view illustrating the linkage action when the ground-contacting wheel rides in a depression in the ground.

Figure 5 is an enlarged sectional elevation taken substantially on the line 5—5 of Figure 1.

Figure 6 is a sectional view taken substantially on the line 6—6 of Figure 1.

Figure 7 is a side elevation of a modified form of my invention, partly in section.

Figure 8 is a side elevation of a further modification of my invention, partly in section.

Referring now to the drawings, particularly Figures 1-6, it will be seen that a preferred embodiment of my invention includes a front frame, generally designated 10, and a rear frame, generally designated 11, both of said frames being pivoted on the axles 12 of the ground wheels 13.

The front frame 10 consists of a pair of parallel, longitudinal side rails 14 connected together at the front thereof by means of a V-shaped drag 15. Transverse support is provided by brace 11a and crossed braces 12a, which are pivotally connected together and to the frame through the agency of bolts 16. Further transverse connecting means is provided by the rectangular support member, generally designated at 17, which includes a pair of vertical bars 18 welded to the side rails 14 near the center thereof, and horizontal transverse bars 19 pivotally connected to the vertical bars 18 by means of bolts 20. Downwardly-directed arms 21, welded to side rails 14, are pivoted on the axles 12.

The rear frame 11 includes a pair of parallel longitudinal side rails 22 connected together at the rear thereof by means of a transverse brace 23 which is pivotally connected to the side rails 22 with bolts 24. A pair of arms 25, extending downwardly and to the rear from side rails 22, provide support means for a drag plate 26. The forward ends of side rails 22 are pivoted on the axles 12.

The scraper blade 27, having a pair of forwardly projecting side wings 28 at either end thereof, is supported transversely of the frames 10 and 11 on a pair of levers 29. The levers 29, which act as connecting links between the front frame 10 and the rear frame 11, are pivotally connected to the side rails 22 by means of pins 30 and spaced therefrom by washers 31. The ends of the levers 29 remote from the scraper blade 27 are operatively connected to the side rails 14 by means of a pair of depth adjusters 32, described in more detail below, which are pivoted to levers 29 and side rails 14 through pins 33 and 34 respectively.

Means are provided to maintain the drag plate 26 at the correct angle of attack with respect to the surface of the ground, and, as shown in the drawings (particularly Figure 5), these means may include the plates 35 welded to the L-shaped drag plate, so as to form a triangle in cross-section. The plates 35 are secured to the arms 25 by means of bolts 36 through sleeves 37, the sleeves 37 being longer than the combined thicknesses of the plates 35 and arms 25, so that sufficient play is allowed between the drag 26 and arms 25 to permit the drag to assume the correct angle of attack with respect to the ground level regardless of lateral motion of the arms 25.

A Y-shaped tongue member 38, adapted to be hitched to a tractor, is hinged, or pivotally connected to the side rails 14 by means of brackets 39 and pins 40. Sidewise movement of the tongue member is prevented by a pair of spaced, vertical angle guides 41 secured to the front of the drag 15. Additional support is provided by braces 42 connected to guides 41 and to vertical angles 43. Apertures 44 are provided in guides 39, so that a pin (not shown) may be inserted through the appropriate pair of apertures to fix the tongue member at the desired angle.

The operation of the above-described embodiment of my invention is illustrated in Figures 3 and 4. Comparing Figure 2 with Figure 3, it will be seen that as the ground wheels 13 ride up on a rise in the ground, the axles 12 likewise move upwardly, causing the frames 10 and 11 to pivot upwardly about horizontal axes defined by the ground-contacting drags 15 and 26 respectively. The upward motion of the rear portion of frame 10 will be greater than the upward motion of the portion of the frame 11 adjacent the pins 30, since the length of the side rails 14 is greater than the distance between the rear drag plate 26 and the pivot pins 30, and hence the levers 29 will scissor, or pivot with respect to side rails 22, maintaining the scraper blade 27 in substantially the same position, relative to the drags, as before.

Referring now to Figure 4, it will be seen that when a depression in the ground is encountered by the wheels 13 the reverse of the above-described action takes place, the blade 27 being maintained in substantially the same horizontal plane.

It should be noted that the transverse connecting members 11a, 12a, 19 and 23 are pivotally connected to the side rails, as described above, and sufficient play or flexibility in these and the other transverse connecting members of the structure is provided to permit relative vertical movement between the respective side rails of the front and rear frames so that the linkage systems of each side of the land leveler may operate independently of the other. The scraper blade 27 is therefore maintained horizontal even though one of the wheels 13 is higher than the other.

Means are provided whereby the depth of cut of the scraper blade may be adjusted, and, as shown in Figures 1 and 2, this may include the above-mentioned depth adjusters 32 which include crank shafts 45 journaled in bearing blocks 46 which are pivoted at 34 to the side rails 14. The crank shafts are threaded at the other ends thereof and engaged with nuts 47 welded to plates 48 which are pivoted to levers 29 at 33. Thrust collars 49, keyed to the shafts 45, prohibit longitudinal motion of the shafts with respect to the side rails 14. By turning the crank shafts, the distance between the adjacent ends of side rails 14 and levers 29 may be varied, thus raising or lowering the scraper blade 27 with respect to the drags 15 and 26. Apertures 50 in side rails 14 provide further adjustment means.

Means are provided for securing the leveler in an inoperative position so that it may be easily transported to and from the field. As shown in Figure 2, this may include the short locking bars 51 which are pivotally connected to the side rails 22. When the free ends 52 of the bars 51 are swung upwards and secured to the side rails 14 at 53, the drags 15 and 26 and the scraper blade 27 are thereby held off the ground, the leveler resting wholly on the ground-contacting wheels 13. Means are provided whereby this may be accomplished with a minimum of manual effort. As shown in Figures 1 and 2, this may include the arms 54, pivotally connected to the side rails 22 adjacent the rear ends thereof. When it is desired to secure the leveler in inoperative position, the arms 54 may be swung downwardly until the ends 55 contact the ground. The length of the arms 54 is substantially greater than the distance from the ground to the rails 22 so that the arms will, when released, assume an angle with respect to the ground. The leveler may then be pulled forward, the arms 54 will bite into the ground and, as forward motion is continued, cause the drag 26 to be lifted off the ground, bringing the side rails 22 sufficiently close to the rear ends of rails 14 to allow the free ends 52 of the bars 51 to be secured thereto.

A modified form of my invention is illustrated in Figure 7, and includes a front frame generally designated 60 and a rear frame generally designated 61, both of said frames being pivoted on the axles 63 of the ground wheels 64.

The front frame 60 includes a pair of parallel, longitudinal side rails 65 connected together at the front thereof by means of V-shaped drag 66 and pivoted at the rear ends on the axles 63. The tongue member 67 is pivoted to the side rails 65 by means of pins 68, but is otherwise the same as the tongue member 36 in Figure 2 and is held against sidewise movement by similar guide members 69.

The rear frame 61 includes a pair of parallel, longitudinal side rails 70 pivoted at the front ends thereof to the axles 63 and connected at the rear by the drag 71 which is secured to the arms 72 in the same manner as the arrangement described above and illustrated best in Figure 5. Further transverse support is provided by the rectangular support member 73, which corresponds to the member 17 described above, and the cross braces 74 corresponding to the cross braces 12. The scraper blade 75 is carried by the levers 76 which are pivoted to side rails 65 by means of pins 77 and attached to side wings 75a.

Upstanding links 78 are pivoted to the ends of the levers 76 remote from the scraper blade and to elongated arms 79 which are welded to side rails 70 adjacent the forward ends thereof.

Blade depth adjustment means are provided by the apertures 80 in links 78. If the pivot pins 81, which connect links 78 to arms 79, are lowered (with respect to the position shown in Figure 7) the blade 75 will be raised with respect to the wheels 64.

The leveler may be raised to an inoperative position for transportation by connecting the locking bars 82 to the side rails 65 at 83, in the same manner as described above.

A further modification of my invention is illustrated diagrammatically in Figure 8. It includes a front frame, generally designated 90, and a rear frame, generally designated 91, both of said frames being pivoted on the axles 92 of the ground wheels 93.

The front frame 90 includes a pair of parallel, longitudinal side rails 94 connected together at the front thereof by means of V-shaped drag 95 and pivoted at the rear ends on the axles 92. The tongue member 96 is pivoted to the side rails 94 by means of pins 97, but is otherwise the same as the tongue member 36 in Figure 2 and is held against sidewise movement by similar guide members 98.

The rear frame includes a pair of parallel, longitudinal side rails 99 pivoted at the front ends thereof to the axles 92 and connected at the rear by the drag 100 which is secured to the arms 101 in the same manner as the arrangement described above and illustrated best in Figure 5. Further transverse support is provided by cross braces 102 which are centrally pivoted together at 103 and to the side rails 99 at 104.

The scraper blade 105 is supported by the arms 106 pivoted to the ends of bell cranks 107 which are in turn pivoted at 108 to standards 109 welded to side rails 94. The opposite ends of bell cranks 107 are pivotally connected to cross-bars 110 pivoted to standards 111 which are welded to side rails 99. Additional support means for the blade are provided by braces 112 and 113 which are pivoted to side rails 90 at 97 and to side wings 115 at 116 and 117.

Blade depth adjustment means are provided by the apertures 118 in arms 106. The blade and drags 95 and 100 may be raised to an inoperative position for transportation of the leveler by connecting the locking bar 119 to the bell crank at 108.

While I have shown and described specific embodiments of my invention, I do not limit myself to the exact details of the constructions set forth, and the invention embraces such changes, modifications and equivalents of the parts and their formation and arrangement as come within the purview of the appended claims.

I claim:

1. A land leveler including a pair of ground-contacting wheels, axles supporting said wheels, a front frame including a pair of parallel elongated side rails pivotally connected at the rear thereof to said axles, a rear frame including a second pair of parallel elongated side rails pivotally connected at the front thereof to said axles, cross members extending between the respective side rails of the frames, means flexibly connecting said cross members to the respective side rails to permit relative vertical movement between the said respective side rails, a transverse scraper blade, and a pair of sets of independently operable linkage members supporting said blade from said frames, said linkage members including a lever pivoted to each rail of one of said pairs of rails and linked to each rail of the other of said pairs of rails, whereby the scraper blade is maintained in the same predetermined horizontal plane regardless of vertical motion of the ground-contacting wheels.

2. A land leveler including a pair of ground-contacting wheels, axles supporting said wheels, a front frame including a pair of parallel elongated side rails pivotally connected at the rear thereof to said axles, a rear frame including a second pair of parallel elongated side rails pivotally connected at the front thereof to said axles, cross members extending between the respective side rails of the frames, means flexibly connecting said cross members to the respective side rails to permit relative vertical movement between the said respective side rails, a transverse scraper blade, and a pair of sets of independently operable linkage members supporting said blade from said frames, said linkage members including a lever pivoted to each rail of one of said pairs of rails and linked to each rail of the other of said pairs of rails, whereby the scraper blade is maintained in the same predetermined horizontal plane regardless of vertical motion of the ground-contacting wheels, and means whereby said leveler may be hitched at its front end to a tractor.

3. A land leveler including a pair of ground-contacting wheels, axles supporting said wheels, a front frame including a pair of parallel elongated side rails pivotally connected at the rear thereof to said axles, a V-shaped drag plate at the front of said front frame, a rear frame including a second pair of parallel elongated side rails pivotally connected at the front thereof to said axles, a drag plate at the rear of said rear frame, cross members extending between the respective side rails of the frames, means flexibly connecting said cross members to the respective side rails to permit relative vertical movement between the said respective side rails, a transverse scraper blade, and a pair of sets of independently operable linkage members supporting said blade from said frames, said linkage members including a lever pivoted to each rail of one of said pairs of rails and linked to each rail of the other of said pairs of rails, whereby the scraper blade is maintained in the same predetermined horizontal plane regardless of vertical motion of the ground-contacting wheels.

4. A land leveler including wheeled ground-contacting means, axle means supporting said wheeled means, an elongated front frame pivotally connected at the rear thereof to said axle means, a ground-contacting element at the front of said front frame, an elongated rear frame pivotally connected at the front thereof to said axle means, a ground-contacting element at the rear of said rear frame, cross members extending between the respective side rails of the frames, means flexibly connecting said cross members to the respective side rails to permit relative vertical movement between the said respective side rails, a transverse scraper blade, a pair of sets of independently operable linkage members supporting said blade from said frames, said linkage members including levers pivoted to one of said frames and linked to the other of said frames, whereby the scraper blade is maintained in the same predetermined horizontal plane regardless of vertical motion of the wheeled ground-contacting means, and locking means on one of said frames whereby said scraper blade may be maintained in an inoperative position for transportation thereof.

5. A land leveler including wheeled ground-contacting means, axle means supporting said wheeled means, an elongated front frame pivotally connected at the rear thereof to said axle means, a ground-contacting element at the front of said front frame, an elongated rear frame pivotally connected at the front thereof to said axle means, a ground-contacting element at the rear of said rear frame, cross members extending between the respective side rails of the frames, means flexibly connecting said cross members to the respective side rails to permit relative vertical movement between the said respective side rails, a transverse scraper blade, a pair of sets of independently operable linkage members supporting said blade from said frames, said linkage members including levers pivoted to one of said frames and linked to the other of said frames, and blade depth adjustment means associated with said linkage members, whereby the scraper blade is maintained in the same predetermined horizontal plane regardless of vertical motion of the wheeled ground-contacting members.

6. A land leveler including a pair of ground-contacting wheels, axles supporting said wheels, a front frame including a first pair of parallel elongated side rails pivotally connected at a point rearwardly of the middle portion thereof to said axles, a rear frame including a second pair of parallel elongated side rails pivotally connected at the front thereof to said axles, a transverse scraper blade, a lever pivoted at a point intermediate the ends thereof to each rail of said second pair of rails and supporting said blade at one end thereof, and a link member pivotally connected to the other end of each of said levers and to the rear end of each rail of said first pair of rails.

7. A land leveler including a pair of ground-contacting wheels, axles supporting said wheels, a front frame including a first pair of parallel elongated side rails pivotally connected at a point rearwardly of the middle portion thereof to said axles, a ground-contacting element connecting the front portions of said first pair of rails, a rear frame including a second pair of parallel elongated side rails pivotally connected at the front thereof to said axles, a ground-contacting element connecting the rear portions of said second pair of rails, a transverse scraper blade, a lever pivoted at a point intermediate the ends thereof to each rail of said second pair of rails and supporting said blade at one end thereof, and a link member pivotally connected to the other end of each of said levers and to the rear end of each rail of said first pair of rails.

8. A land leveler as in claim 7 in which the link member includes blade depth-adjuster means comprising a bearing block pivotally connected to the rear end of each rail of said first pair of rails, a crank shaft journaled in each of said bearing blocks, and a threaded block pivotally connected to the free end of each of said levers, said crank shafts being threadably engaged with said threaded blocks, whereby upon rotation of the crank shafts the levers may be pivoted so as to change the vertical position of the blade with respect to the said ground-contacting members.

9. A land leveler including a pair of ground-contacting wheels, axles supporting said wheels, a front frame including a first pair of parallel elongated side rails pivotally connected at a point rearwardly of the middle portion thereof to said axles, a ground-contacting element connecting the front portions of said first pair of rails, a rear frame including a second pair of parallel elongated side rails pivotally connected at the front thereof to said axles, a ground-contacting element connecting the rear portions of said second pair of rails, a transverse scraper blade, a lever pivoted at a point intermediate the ends thereof to each rail of said second pair of rails and supporting said blade at one end thereof, a link member pivotally connected to the other end of each of said levers and to the rear end of each rail of said first pair of rails, and a locking bar on the rear end of each of said first pair of rails, said locking bars being adapted to be secured to each of said second pair of rails whereby the blade and the ground-contacting elements may be maintained in an inoperative position.

10. A land leveler including a pair of ground-contacting wheels, axles supporting said wheels, a front frame including a first pair of parallel elongated side rails pivotally connected at a point rearwardly of the middle portion thereof to said axles, a rear frame including a second pair of parallel elongated side rails pivotally connected at the front thereof to said axles, a transverse scraper blade, a lever pivoted at a point intermediate the ends thereof to each rail of said second pair of rails and supporting said blade at one end thereof, a link member pivotally connected to the other end of each of said levers and to the rear end of each rail of said first pair of rails, and means for adjusting the effective length of said link member.

References Cited in the file of this patent

UNITED STATES PATENTS

| | | |
|---|---|---|
| 1,691,854 | Overman | Nov. 13, 1928 |
| 1,765,910 | Eversman | June 24, 1930 |
| 2,177,570 | Juliot | Oct. 24, 1939 |
| 2,269,519 | Christenson | Jan. 13, 1942 |
| 2,283,744 | Lethlean | May 19, 1942 |
| 2,327,236 | Antal | Aug. 17, 1943 |
| 2,444,977 | Clark | July 13, 1948 |
| 2,503,638 | Shuey | Apr. 11, 1950 |